US008902761B2

(12) United States Patent
Yang et al.

(10) Patent No.: US 8,902,761 B2
(45) Date of Patent: Dec. 2, 2014

(54) METHOD AND APPARATUS FOR PROVIDING LONG TERM EVOLUTION NETWORK TOPOLOGY MANAGEMENT

(75) Inventors: Chen-Yui Yang, Marlboro, NJ (US); Wen-Jui Li, Bridgewater, NJ (US); Minghsien Wang, Marlboro, NJ (US); Quangchung Yeh, Parsippany, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1022 days.

(21) Appl. No.: 12/969,504

(22) Filed: Dec. 15, 2010

(65) Prior Publication Data

US 2012/0155321 A1    Jun. 21, 2012

(51) Int. Cl.
| | |
|---|---|
| H04L 12/26 | (2006.01) |
| H04L 12/24 | (2006.01) |
| H04W 24/04 | (2009.01) |
| H04W 88/18 | (2009.01) |

(52) U.S. Cl.
CPC ............. *H04W 24/04* (2013.01); *H04L 41/12* (2013.01); *H04L 41/0213* (2013.01); *H04W 88/18* (2013.01)
USPC ....................................... 370/241.1; 370/250

(58) Field of Classification Search
None
See application file for complete search history.

(56) References Cited

U.S. PATENT DOCUMENTS

| | | | | |
|---|---|---|---|---|
| 6,151,031 | A   * | 11/2000 | Atkins et al. ................... | 345/441 |
| 6,233,618 | B1 * | 5/2001  | Shannon ....................... | 709/229 |
| 6,421,727 | B1 * | 7/2002  | Reifer et al. .................. | 709/225 |
| 6,721,735 | B1 * | 4/2004  | Lee ..................................... | 1/1 |
| 7,646,752 | B1 * | 1/2010  | Periyalwar et al. ............ | 370/338 |
| 2003/0007000 | A1 * | 1/2003 | Carlson et al. ................ | 345/713 |
| 2003/0009551 | A1 * | 1/2003 | Benfield et al. ............... | 709/224 |
| 2004/0081167 | A1 * | 4/2004 | Hassan-Ali et al. ..... | 370/395.42 |
| 2004/0111469 | A1 * | 6/2004 | Manion et al. ................ | 709/204 |
| 2004/0247089 | A1 * | 12/2004 | Vishik et al. ............... | 379/88.01 |
| 2006/0028999 | A1 * | 2/2006 | Iakobashvili et al. ........ | 370/252 |
| 2009/0046655 | A1 * | 2/2009 | Zhao et al. .................... | 370/331 |
| 2012/0284008 | A1 * | 11/2012 | Ennis ............................ | 703/21 |

* cited by examiner

*Primary Examiner* — Ian N Moore
*Assistant Examiner* — Eric P Smith

(57) ABSTRACT

A method and apparatus providing a network topology management of a wireless communication network are disclosed. The method discovers network topology data of the wireless communication network, wherein the wireless communication network comprises a self-healing capability, and identifies a difference between the network topology data that is discovered against a stored network topology data of the wireless communication network. The method updates the stored network topology data with the difference that is identified.

17 Claims, 9 Drawing Sheets

METHOD AND APPARATUS FOR PROVIDING LONG TERM EVOLUTION NETWORK TOPOLOGY MANAGEMENT

The present disclosure relates generally to communication network and, more particularly, to a method and apparatus for providing Long Term Evolution (LTE) network topology management in a wireless communication network.

BACKGROUND

In a 3GPP Long Term Evolution (LTE) network, service outages and degradation can be difficult to detect (e.g., a sleeping cell) and will require considerable manual effort for troubleshooting. These service outages or degradations are difficult to detect because of the self-healing aspect of certain cellular network, e.g., the LTE network. For example, services in a failed cell site can be automatically covered by neighboring cell sites. Hence, the failed or degraded cell site can remain in a failed or degraded state without being noticed for a period of time. The LTE network topology changes dynamically due to the self healing capability when a cell site enters into or goes out of service. This requires that the network topology data, used by the wireless service provider, to be updated accordingly in order to provide effective fault and performance correlation as well as service impact analysis.

SUMMARY

In one embodiment, the present method and apparatus provide a network topology management of a wireless communication network. The method discovers network topology data of the wireless communication network, wherein the wireless communication network comprises a self-healing capability, and identifies a difference between the network topology data that is discovered against a stored network topology data of the wireless communication network. The method updates the stored network topology data with the difference that is identified.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

As discussed above, in a 3GPP Long Term Evolution (LTE) network, the self-healing aspect of the LTE network causes the network topology to change dynamically when a cell site enters into or goes out of service. This requires that the network topology data, used by the wireless service provider, to be updated accordingly in order to provide effective fault and performance correlation as well as service impact analysis.

To address this criticality, the present method and apparatus enable a wireless communication service provider to manage the topology of the LTE network and obtain accurate network topology and configuration data to keep track of dynamic changes in the LTE network. Using the accurate network topology and configuration data, the wireless service provider can accurately and effectively correlate fault scenarios and alarms from the LTE network. For example, the method performs network topology discovery and updates the network topology data when the network topology has changed, wherein the updated network topology data is used by the service provider to correlate a plurality of alarms from a plurality devices down to a single device which is the root cause of a service trouble in the LTE network.

Broadly defined, an eNodeB is a radio base transceiver station (RBS) as per the 3GPP standards (or simply referred to as a base station). An eNodeB provides the LTE air interface and performs radio resource management for wireless access. 3GPP is a global effort to define a wireless communication system specification. In 3GPP release 8, LTE is a set of enhancements to the Universal Mobile Telecommunications System (UMTS) which focuses on adopting 4th Generation (4G) mobile communication's technology including an all-Internet Protocol (IP) end-to-end networking architecture.

Figure 1:
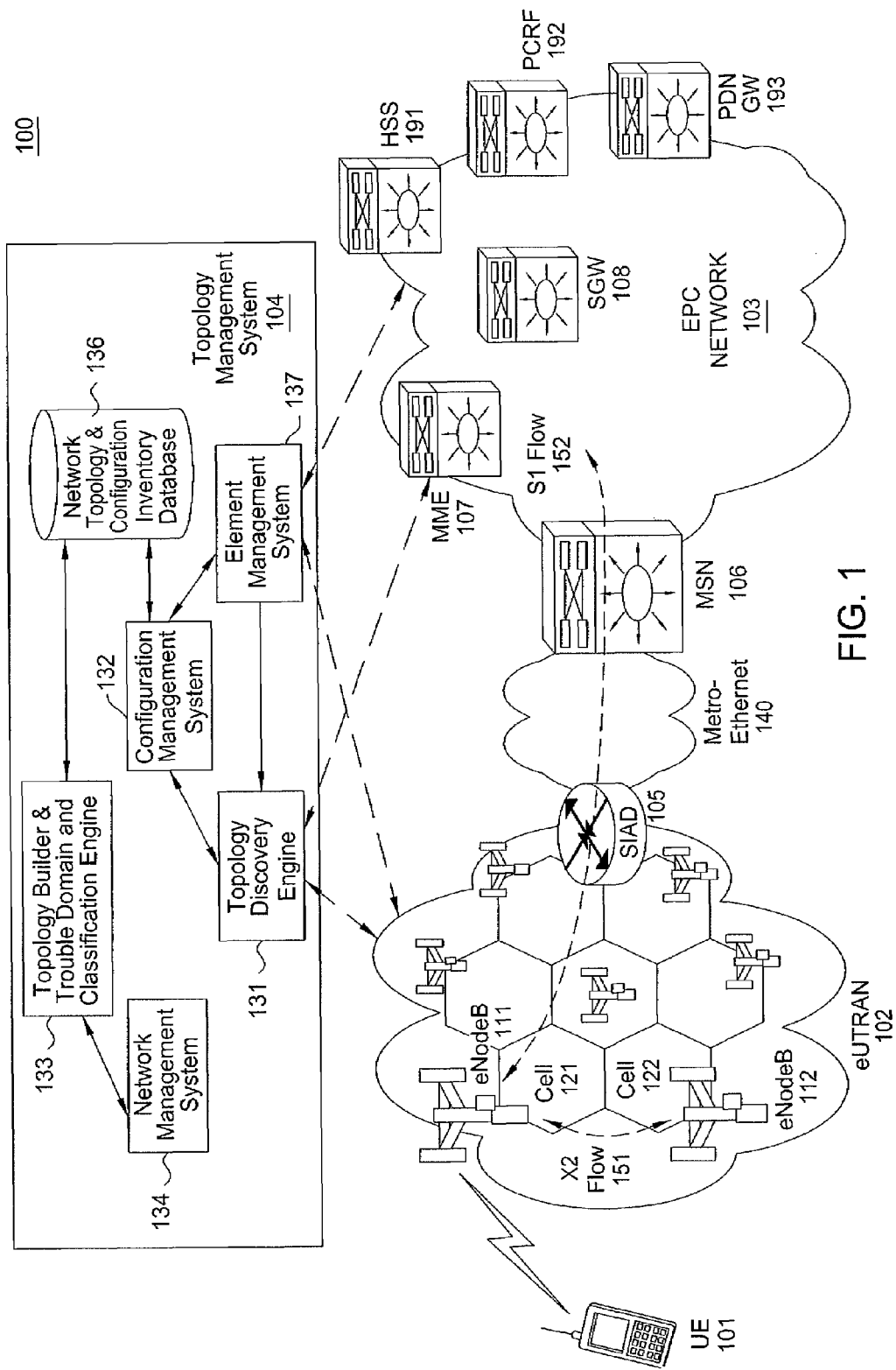
FIG. 1 illustrates an exemplary LTE network related to the present disclosure.

FIG. 1 illustrates an exemplary LTE network 100 related to the present disclosure. In one embodiment, the LTE network 100 comprises an access network 102 (e.g., an evolved Universal Terrestrial Radio Access Network (eUTRAN)), a core network 103 (e.g., an Evolved Packet Core (EPC) network), a metro-Ethernet network 140, and a topology management system (TMS) 104 supported by a wireless service provider. User Equipment (UE) 101 accesses wireless services via an eNodeB, e.g., eNodeB 111 in the eUTRAN 102. UE 101 can be a smart phone, a computer or laptop, or any endpoint devices equipped with 4G wireless capabilities. An eNodeB, such as eNodeB 111, provides wireless interfaces to one or more UE devices. It should be noted that an eUTRAN, e.g., eUTRAN 102, comprises one or more eNodeBs, e.g., 111 and 112. All eNodeBs in the eUTRAN 102 are connected to the EPC network 103 via one or more integrated access device 105 (e.g., a Smart Integrated Access Device (SIAD)). Broadly, an integrated access device is capable of integrating both voice and data services within a single device. In eUTRAN 102, eNodeB 111 supports wireless services covered by cell site 121 and eNodeB 112 supports wireless services covered by cell site 122.

In one embodiment, eUTRAN 102 is connected to the EPC network 103 via metro-Ethernet network 140 serving as a transport network. In particular, SIAD 105 in eUTRAN 102 is connected to Multi-service Node (MSN) 106 in EPC network 103 via metro-Ethernet network 140. An EPC network provides key functions that support wireless services in the LTE environment. In one embodiment, an EPC network is an Internet Protocol (IP) packet core network that supports both real-time and non-real-time service delivery across a LTE network, e.g., as specified by the 3GPP standards.

In one embodiment, the SIAD is a device that provides wireless traffic aggregation and backhaul from a cell site to an EPC network. An MSN provides layer 2 and layer 3 networking functions for wireless service between one or more SIADs and the EPC network and the eUTRAN is the air interface of the 3GPP's Long Term Evolution (LTE) specifications for mobile networks. Namely, the eUTRAN comprises a radio access network standard that will replace previous generations of air interface standards.

In EPC network 103, network devices Mobility Management Entity (MME) 107 and Serving Gateway (SGW) 108 support key functions as part of the LTE network 100. MME 107 is the control node for the LTE access-network. It is responsible for UE (User Equipment) tracking and paging (e.g., such as retransmissions), bearer activation and deactivation process, selection of the SGW, and authentication of a user. SGW 108 routes and forwards user data packets, while also acting as the mobility anchor for the user plane during inter-eNodeB handovers and as the anchor for mobility between LTE and other wireless technologies, such as 2G and 3G wireless networks.

In addition, in EPC network 103, the Home Subscriber Server (HSS) 191 contains subscription-related information (e.g., subscriber profiles), performs authentication and authorization of a wireless service user, and provides information about the subscriber's location. The Policy Charging and Rule Function (PCRF) 192 supports accesses to subscriber databases and specialized functions of a charging system. The Public Data Network Gateway (PDN GW) 193 is a gateway that provides access between the EPC network 103 and the public data network.

In one embodiment, the TMS 104 comprises a collection of modules that provides topology management of dynamic changes occurring in an LTE network. For example, the TMS 104 comprises a Topology Discovery Engine (TDE) 131, a Configuration Management System (CMS) 132, a Topology Builder and Trouble Domain and Classification Engine (TBTDCE) 133, a Network Management System (NMS) 134, a Network Topology and Configuration Inventory Database (NTCID) 136, and an Element Management System (EMS) 137. The functions performed by these modules will be described below.

In one embodiment, the TDE 131 supports the discovery functions of dynamic changes in the LTE network. For example, TDE 131 uses information collected from devices in eUTRAN 102, EPC network 103, and EMS 137 as inputs to support dynamic topology change discovery in the LTE network.

In FIG. 1, X2 interface flow 151 is used to communicate between two eNodeBs, e.g., between eNodeB 111 and eNodeB 112; S1 interface flow 152 is used to communicate between an eNodeB, such as eNodeB 111, and a device in EPC network 103, such as MME 107 and SGW 108. Note that the S1 and X2 interfaces are standard interfaces defined by the 3GPP standard.

In one embodiment, the CMS 132 receives inputs from TDE 131 and performs the appropriate configuration data consolidation and update. For instance, CMS 132 receives newly discovered LTE network topology and configuration change data discovered by TDE 131 and updates those data in EMS 137 and NTCID 136 accordingly.

In one embodiment, TBTDCE 133 generates a LTE network topology view as well as supports network alarm correlation functions. The generated network topology and alarm correlation information will be sent to NMS 134 for further processing.

In one embodiment, the NMS 134 performs network level management of the LTE network 100.

In one embodiment, the NTCID 136 contains the inventory of all network topology and configuration data of the LTE network 100.

In one embodiment, the EMS 137 is a module that provides management of one or more specific types of network elements, e.g., eNodeBs, SIADs, MMEs etc., in the LTE network 100.

Figure 2:
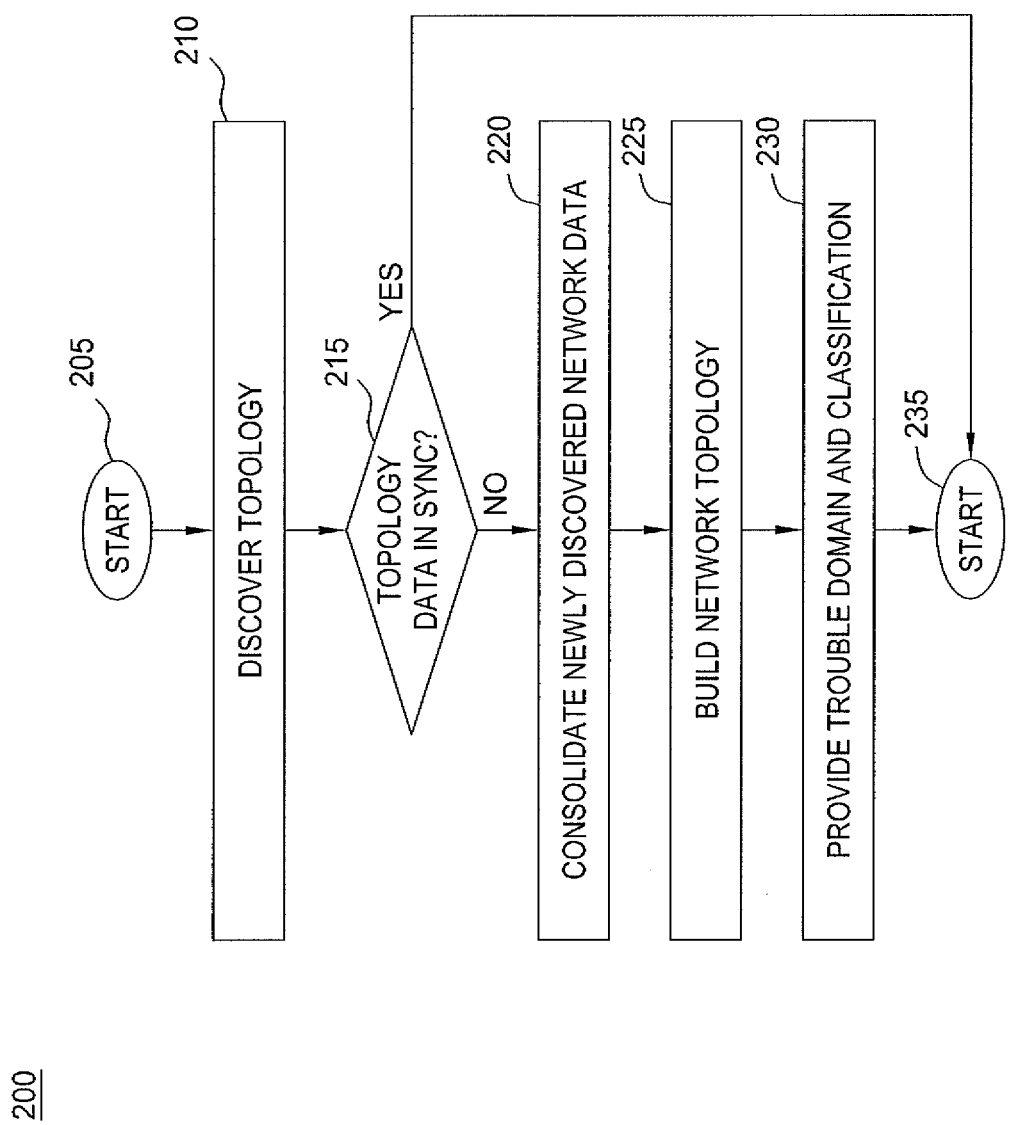
FIG. 2 illustrates a flow chart of a method for network topology management in an LTE network of the present disclosure.

FIG. 2 illustrates a flow chart of a method 200 for network topology management in an LTE network of the present disclosure. For example, one or more steps of method 200 can be implemented by the TMS 104. Method 200 starts in step 205 and proceeds to step 210.

In step 210, a TDE discovers the topology of the LTE network, e.g., retrieves network topology, configuration and connectivity data from one or more network devices (e.g., a SIAD in an eUTRAN or a MME in an EPC network) in or from an EMS having the data for the one or more network devices associated with an LTE network. Given that the LTE network has the ability to self-heal, the topology of the LTE network may change, e.g., an eNodeB interacting with a different SIAD in support of another sleeping eNodeB. Such change may be dynamically implemented without the knowledge of the network. Over time, the "current" network topology may have changed to such a degree that it no longer matches a "stored" topology as noted by the network. As such, when a fault isolation function is implemented on the "stored" topology, inconsistent results may result. Thus, discovery of the topology may need to be implemented, e.g., on a periodic schedule (e.g., daily, weekly, and so on).

In one embodiment, the retrieval can be performed through various standard protocols or interfaces including, but not limited to, File Transfer Protocol (FTP), Simple Network Management Protocol (SNMP), Common Object Request Broker Architecture (CORBA), Web service, and Application Programming Interface (API). For example, the TDE uses the ping command to validate the IP addresses of the network devices and adds the validated IP addresses to a validated list. The TDE may also use the traceroute command sent to these network devices to determine the network connectivity of these devices.

In step 215, the TDE determines if a stored pre-provisioned network topology data and the discovered post-deployment network topology and configuration data are in sync. If the data are in sync, the method proceeds to step 235; otherwise, the method proceeds to step 220.

In step 220, the CMS consolidates the newly discovered network topology data that are different from the stored network topology data using the validated list from step 210 and then updates the appropriate systems in the LTE network. For instance, the CMS loads the newly discovered network topology data that are different from the stored network topology data to an EMS system and updates the newly discovered network topology data that are different from the stored network topology data to the NTCID. The CMS creates objects in a hierarchical manner in the order of location, node, card, port, circuit, logical connection, pool, cell, and sector objects to reflect changes, e.g., a network device that has entered into service, in the LTE network.

Note that an object is created only if the object does not already exist and the required components associated with the primary key exist. For instance, a port object for an eNodeB can only be created if both the eNodeB device object and the card object associated with the eNodeB exist.

If an object already exists, the object table fields containing the pre-provisioned data will be modified using the updated post-installation data fed by the TDE. The last-update-time of the modified object will be updated with the current timestamp.

Figure 3:
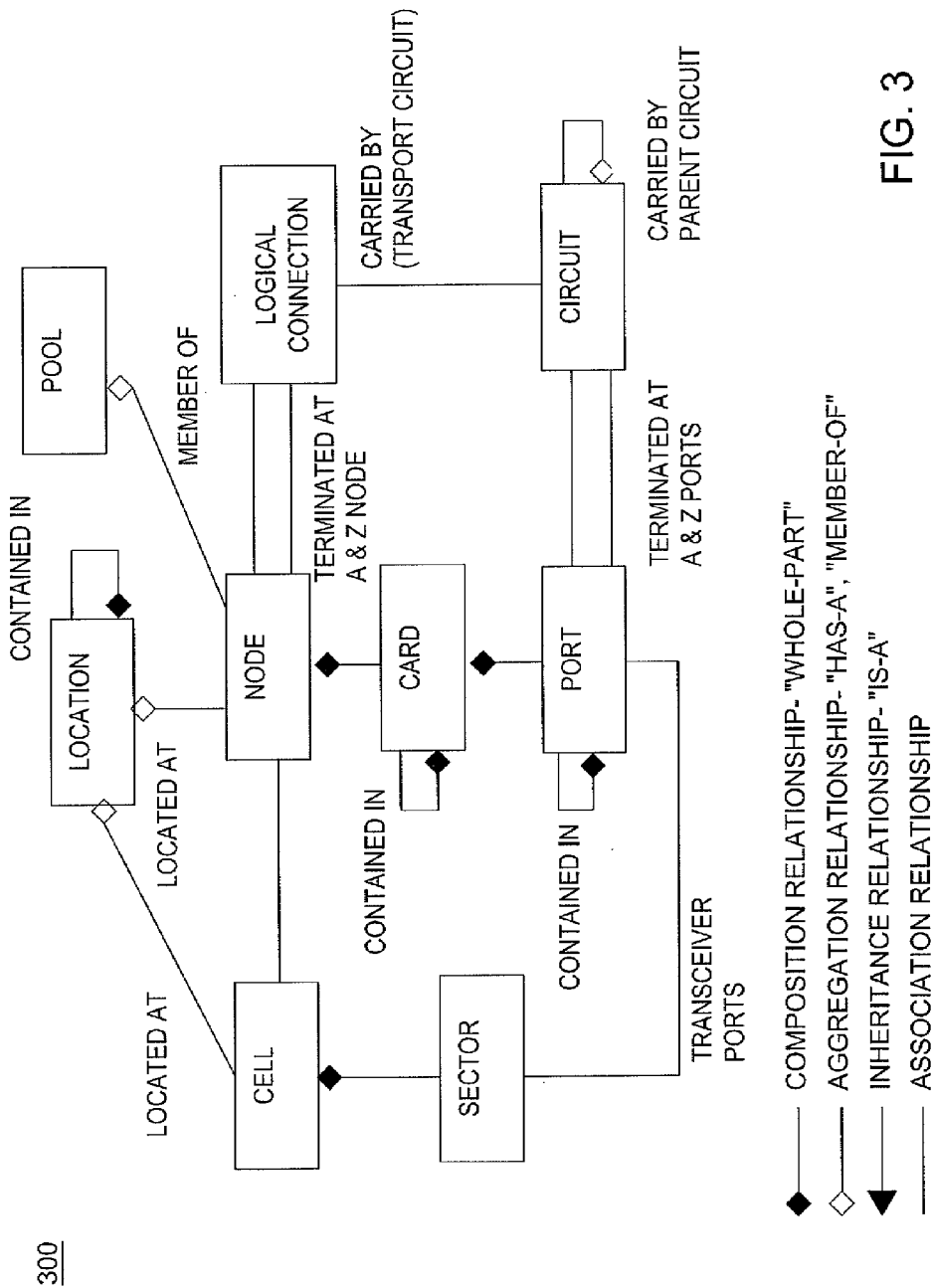
FIG. 3 illustrates an exemplary LTE object model of the present disclosure.

FIG. 3 illustrates an exemplary LTE object model 300 of the present disclosure. The figures shows the relationships between the various objects including the location, node, card, port, circuit, logical connection, pool, cell, and sector object classes. It should be noted that the LTE object model 300 is only illustrative and should not be interpreted as a limitation to the present disclosure.

In one embodiment, the location object class represents a physical network location that contains network equipment. Location types are "Cell Site", "Data Center", "MTSO", "NOC", and etc., where "MTSO" represents Metropolitan Servicing Office and "NOC" represents Network Operations Center. The location object class has an aggregation relationship with the cell object class. For instance, multiple cell objects can be aggregated within a location object. Similarly, the location object class has an aggregation relationship with the node object class.

Table 1 illustrates an exemplary location object class table related to the present disclosure. In Table 1, the LOCATION_OBJ_ID field is of number type and is the primary key of the table.

The node object class represents a network element or device. A node contains equipment objects of racks, shelves, slots, cards, and ports. The node types in an LTE network includes, but are not limited to, eNodeB, MME, SWG, SIAD, and MSN etc. The node object class has a composition relationship with the card object class. For instance, a node object can be composed of a card object.

Table 2 illustrates an exemplary node object class table related to the present disclosure. In Table 2, the NODE_OBJ_ID field is of number type, which represents the record database key, and a primary key of the table. The NodeType field is of variable length character type and provides the type of network element or device associated with the node. The NodeName field is of variable length character type and provides an eleven characters Common Language Location Identifier (CLLI) code of the node. The VENDOR field is of variable length character type and provides the manufacturer of the associated node network element or device. The MODEL field is of variable length character type and provides the equipment model of the associated node network element or device. The REV field is of variable length character type and provides the revision of the associated node network element or device. The ParentLocation field is of number type and provides the parent location object referencing the node object. The ParentLocation field serves as a foreign key to the table. This field also serves as the foreign key, to the location object, of the location table. The IP_ADDRESS field is of variable length character type and provides the IP address of the node. The PoolID field is of string type and provides the identification of the MME pool object associated with an eNodeB. The PoolID field serves as a foreign key to the table. An eNodeB can have one Pool ID and a MME can be assigned to a MME pool. Each MME pool can have multiple MME as its members. For an eNodeB node object, the table can also contain eNB-ID, which is unique for all eNodeBs. The PrimarySecondary field is of character type and provides the flag to distinguish the node's role, e.g., a primary or a secondary node.

The card object class comprises the ports on a network element or device that communicate with other ports in other network elements or devices. A card can also contain sub-slots that again contain other cards. The card object class has a composition relationship with the port object class. For instance, a card object can be composed of a port object.

TABLE 1

| FIELD NAME | Data Type | FIELD DESCRIPTION/VALUE | Primary Foreign Key | Example |
|---|---|---|---|---|
| LOCATION_OBJ_ID | Number | Location object DB key | P | |
| LocationID | String | Granite Location ID | | NJNJXX-RCPK02 |
| LocationType | | Cell Site, Data Center, HUB, MTSO, NOC | | Cell Site, Data Center, HUB, MTSO, NOC |
| LocationCLLI | String | 8 characters CLLI | | RCPKNJ02 |
| ParentLocation | Number | PARENT_SITE_INST_ID | | NYC |
| CITY | String | | | New York |
| STATE | String | | | NY |
| MARKET | | SITE GENERAL INFO | | NYC |
| ED_MARKET | | SITE GENERAL INFO | | NYC/NNJ |
| REGION | | SITE GENERAL INFO | | NORTHEAST |
| TICKETING SYSTEM LOCATION ENTRYID | | SITE INTERFACE INFO | | LC00045807 |
| TECHNOLOGY | | GSM, LTE, UMTS Served by Ethernet, Served by Fiber | | |
| CITY | String | | | New York |
| STATE | String | | | NY |

TABLE 2

| FIELD NAME | Data type | FIELD DESCRIPTION/VALUE | Primary Foreign Key | Example |
|---|---|---|---|---|
| NODE_OBJ_ID | NUMBER | Node object DB key | P | |
| NodeID | String | Granite Node ID | | BSC21-01 BMG01 |
| NodeType | String | BTS, BSC, MSC, SGSN, GGSN, NodeB, RNC, ENodeB, RRH, MME, SGW, PGW, PCRF, DACS, MSN, SIAD, NTE | | BTS, BSC, MSC, SGSN, GGSN, NodeB, RNC, ENodeB, RRH, MME, SGW, PGW, PCRF, DACS, MSN, SIAD, NTE |
| NodeCLLI | STRING | 11 characters CLLI | | |
| eNB-ID | NUMBER | | | From NDR input |
| VENDOR | STRING | | | Nokia |
| MODEL | STRING | | | DX 200 BSC2I |
| REV | STRING | | | |
| DESCR | STRING | | | |
| PoolID | String | Contained in MME_Pool (for MME & eNB nodes only) | F(Pool Table) | |
| ParentLocation | NUMBER | Parent LOCATION_OBJ_ID | F(Location Table) | |
| LINEUP | STRING | | | 0106 |
| FRAME | STRING | | | 10 |
| SHELF | STRING | | | |
| CLEI | STRING | | | |
| TICKETING SYSTEM COMMON ID | | EQUIPMENT GENERAL INFO | | BMG01 |
| TICKETING SYSTEM EQUIPMENT ID | | EQUIPMENT GENERAL INFO | | MTGMALIRBSC0001 |
| TICKETING SYSTEM EQUIPMENT NAME | | EQUIPMENT GENERAL INFO | | MONTGOMERY MTSO BSC2I-01 |
| TICKETING SYSTEM OLD COMMON ID | | EQUIPMENT GENERAL INFO | | |
| TICKETING SYSTEM OLD EQUIPMENT NAME | | EQUIPMENT GENERAL INFO | | |
| TICKETING SYSTEM PARENT ID | | EQUIPMENT GENERAL INFO | | BMG01 |
| TICKETING SYSTEM PARENT NAME | | EQUIPMENT GENERAL INFO | | |
| TECHNOLOGY | | EQUIPMENT GENERAL INFO | | GSM |
| TICKETING SYSTEM EQUIPMENT ENTRYID | | EQUIPMENT INTERFACE INFO | | ECMW00000146253 |
| Force TICKETING SYSTEM Transmit | | EQUIPMENT INTERFACE INFO | | |
| SENT TO TICKETING SYSTEM | | EQUIPMENT INTERFACE INFO | | |
| IP_ADDRESS | STRING | Device DNS IP Address | | |
| ADDRESS_HEX_NBR | STRING | | | |
| PrimarySecondary | Char | | | P, S |

Table 3 illustrates an exemplary card object class table related to the present disclosure. In Table 3, the CARD_OBJ_ID is of number type and is the primary key of the table. The Node field is of string type and provides the node object referencing the card object. The Node field serves as a foreign key to the table. The Card field is of number type and provides parent card object referencing the card object if the card object is a sub-card. The Card field serves as a foreign key to the table. The PrimarySecondary field is of character type and provides the flag to distinguish the card's role, e.g., a primary or a secondary card.

The port object class represents the interface between network devices and circuits (or network links). A port is associated with one end of a circuit or network link. A port usually resides on a card. But a port also may exist on a device (called device port). A high-bandwidth port (e.g., a DS3 port) can contain a set of low-bandwidth ports (e.g., DS1 port).

TABLE 3

| FIELD NAME | Data Type | FIELD DESCRIPTION/VALUE | Primary Foreign Key | Example |
|---|---|---|---|---|
| CARD_OBJ_ID | NUMBER | Card object DB key | P | |
| CardID | STRING | FRAME-SHELF-SLOT (build by GFP) | | |
| CardType | | | | DS1 INTFC |
| CardName | STRING | | | |
| Node | STRING | NODE_OBJ_ID | F (Node Table) | |

TABLE 3-continued

| FIELD NAME | Data Type | FIELD DESCRIPTION/VALUE | Primary Foreign Key | Example |
|---|---|---|---|---|
| Card | NUMBER | CARD_OBJ_ID (Parent Card Object ID, if this is a sub-card) | F (Card Table) | |
| PortCount | NUMBER | | | 4 |
| FRAME | STRING | Frame Number | | 02 |
| SHELF | STRING | Shelf Number | | |
| SLOT | STRING | Slot Number; | | 0E |
| DESCR | STRING | | | ET2A CARD |
| PrimarySecondary | Char | | | P, S |

Table 4 illustrates an exemplary port object class table related to the present disclosure. In Table 4, the PORT_OBJ_ID is of number type and is the primary key of the table. The ParentPort field is of number type and provides the parent port object referencing the port object. The ParentPort field serves as a foreign key to the table. The Node field is of number type and provides the node object referencing the port object. The Node field serves as a foreign key to the table. The Card field is of number type and provides card object referencing the port object. The Card field serves as a foreign key to the table. The Location field is of number type and provides the location object referencing the port object. The Location field serves as a foreign key to the table. The Circuit field is of number type and provides the circuit object referencing the port object. The Circuit field serves as a foreign key to the table. The PrimarySecondary field is of character type and provides the flag to distinguish the port's role, e.g., a primary or a secondary port.

The circuit object class represents a logical connection of certain bandwidth provided by the physical network of nodes and links. A circuit has two end ports: an A-end port and a Z-end port. It has a specified transmission speed or bandwidth capacity. Circuits are assembled in layers. A circuit may be divided into channels or time-slots, which can be allocated to the underlying child circuits. In this case, the parent circuit is carrying those low-bandwidth child circuits. The highest level of circuit is carried by a physical link. An end-to-end circuit layout starts with the A-end port. It may travel through multiple parent circuits, and ends with the Z-end port. The circuit object class has an association relationship with the port object class. For instance, a circuit object has two termination points, the A and Z ends, and each of the termination points is associated with a port object.

TABLE 4

| FIELD NAME | Data Type | FIELD DESCRIPTION/VALUE | Primary Foreign Key | Example |
|---|---|---|---|---|
| PORT_OBJ_ID | NUMBER | Port object DB Key | P | |
| PortID | String | | | |
| PortType | String | BANDWIDTH | | |
| ParentPort | NUMBER | PORT_OBJ_ID | F(Port Table) | |
| Card | NUMBER | CARD_OBJ_ID | F(Card Table) | |
| Node | NUMBER | NODE_OBJ_ID | F(Node Table) | |
| Location | NUMBER | LOCATION_OBJ_ID | F(Location Table) | |
| DESCRIPTION | STRING | | | |
| CONNECTOR_TYPE | STRING | | | RJ-48C |
| DIRECTION | STRING | | | |
| CIRCUIT | NUMBER | CIRCUIT_OBJ_ID | F(Circuit Table) | |
| PARENT_PORT_CHAN | NUMBER | | | |
| VIRTUAL_PORT | CHAR | | | |
| PORT_ACCESS_ID | STRING | Port AID | | |
| PATH_CHAN_ID | NUMBER | | | |
| IP_ADDRESS | STRING | Interface IP Address | | |
| PrimarySecondary | | | | P, S |

Table 5 illustrates an exemplary circuit object class table related to the present disclosure. In Table 5, the CIRCUIT_OBJ_ID is of number type and is the primary key of the table. The A-end_Port field is of number type and provides the A-end port object referencing the circuit object. The A-end Port field serves as a foreign key to the table. The A-end_Node field is of number type and provides the A-end node object referencing the circuit object. The A-end_Node field serves as a foreign key to the table. The A-end_Location field is of number type and provides the A-end location object referencing the circuit object. The A-end_Location field serves as a foreign key to the table. The Z-end_Port field is of number type and provides the Z-end port object referencing the circuit object. The Z-end Port field serves as a foreign key to the table. The Z-end_Node field is of number type and provides the Z-end node object referencing the circuit object. The Z-end_Node field serves as a foreign key to the table. The Z-end_Location field is of number type and provides the Z-end location object referencing the circuit object. The Z-end_Location field serves as a foreign key to the table. The PrimarySecondary field is of character type and provides the flag to distinguish the circuit's role, e.g., a primary or a secondary circuit.

The logical connection object class provides an LTE inter-node end-to-end communication protocol to support LTE functions. The logical connection types for LTE project are: S1-MME, S1-U, S3, S4, S5, S6a, S7, S10, S11, S12, and X2 (which are interface types defined by the 3GPP standard). The logical connection object class has an association relationship with the node object class. For instance, a logical connection object has two termination points, the A and Z ends, and each of the termination points is associated with a node object. The logical connection object class also has an association relationship with the circuit object class. For instance, a logical connection object is associated with a particular circuit object.

end_NodeID field serves as a foreign key to the table. The A-end_NodeType field is of number type and provides the A-end node type of the node object referencing the logical connection object. The A-end_NodeType field serves as a foreign key to the table.

The Z-end_Port field is of number type and provides the Z-end port ID of the circuit object referencing the logical connection object. The Z-end Port field serves as a foreign key to the table. The Z-end_NodeID field is of number type and provides the Z-end node ID of the circuit object referencing the logical connection object. The Z-end_NodeID field serves as a foreign key to the table. The Z-end_NodeType field is of number type and provides the Z-end node type of the node object referencing the logical connection object. The Z-end_NodeType field serves as a foreign key to the table.

TABLE 5

| FIELD NAME | Data Type | FIELD DESCRIPTION/VALUE | Primary Foreign Key | Example |
| --- | --- | --- | --- | --- |
| CIRCUIT_OBJ_ID | NUMBER | Circuit object DB key | P | |
| CircuitID | String | Granite Circuit ID | | NRCSGAJTPN7/MTGMALIRBMG001/DS1/00001 |
| CircuitType | ENUM | Indicating Circuit Type and Bandwidth | | EVC, Ethernet, 1GIGE, 10GIGE, DS1, DS1C, DS3, DS3C, STS1, STS3, STS12, OC48, OC48C, OC12, OC12C, OC192, OC192C, WDMn (n = 4, 8, 16, 40, 80), Wavelength, Optical, MWnDS3 (n = 1, 2, 3, 4, 8) |
| CircuitCLFI | String | CLFI | | |
| InterfaceType | String | Indicating the underlined connection type (in Logical Connection Table) | | |
| A-end_Port | NUMBER | A-end PORT_OBJ_ID | F(Port Table) | |
| A-end_Node | NUMBER | A-end NODE_OBJ_ID Nod | F(Node Table) | |
| A-end_Location | NUMBER | A-end LOCATION_OBJ_ID | F(Location Table) | |
| Z-end_Port | NUMBER | Z-end PORT_OBJ_ID | F(Port Table) | |
| Z-end_Node | NUMBER | Z-end NODE_OBJ_ID Node | F(Node Table) | |
| Z-end_Location | NUMBER | Z-end LOCATION_OBJ_ID | F(Location Table) | |
| TRUNK_GROUP | STRING | CIRC_PATH_INST | | |
| NBR_CHANNELS | NUMBER | CIRC_PATH_INST | | |
| TOPOLOGY | CHAR | CIRC_PATH_INST | | |
| APPLICATION | | PATH INFO PATH APPLICATION | | LTE, UMTS |
| PrimarySecondary | | | | P, S |

Table 6 illustrates an exemplary logical connection object class table related to the present disclosure. In TABLE 6, the CONNECTION_OBJ_ID is of number type and is the primary key of the table. The A-end_Port field is of number type and provides the A-end port ID of the circuit object referencing the logical connection object. The A-end Port field serves as a foreign key to the table. The A-end_NodeID field is of number type and provides the A-end node ID of the circuit object referencing the logical connection object. The A-

The TransportCircuit field is of number type and provides the circuit object referencing the logical connection object. The TransportCircuit field serves as a foreign key to the table.

The pool object is a collection of node objects. A MME pool is a collection of MME nodes. A SWG pool is a collection of SGW nodes. All nodes in a pool will support fail-over protection and load balancing functions. The pool object class has an aggregation relationship with the node object class. For instance, multiple node objects can be aggregated within a pool object.

TABLE 6

| FIELD NAME | Data Type | FIELD DESCRIPTION/VALUE | PK/FK |
|---|---|---|---|
| Connection_OBJ_ID | Number | Logical connection DB Key | P |
| ConnectionID | String | CIRC_PATH_HUM_ID | |
| ConnectionType | String | A, Abis, D, Iub, IuCS, IuPS, Gn, Gi, Gr, Gc, S1-MME, S1-U, S3, S4, S5, S6a, S7, S11, X2 | |
| A-end_NodeID | String | From a NodeB device | F(Circuit Table) |
| A-end_NodeType | String | | Node Type in Node Table |
| A-end_Port | | | F(Circuit Table) |
| Z-end_NodeID | String | To a RNC device | F(Circuit Table) |
| Z-end_NodeType | | | Node Type in Node Table |
| Z-end_Port | | | F(Circuit Table) |
| Transport Circuit | Number | Carrier transport circuit | F (Circuit Table) |

Table 7 illustrates an exemplary pool object class table related to the present disclosure. In Table 7, the Pool_ID field is of String type and represents the MME Pool Identifier (or Name), as well as serves as a primary key of the table. The PoolType field is of String type and represents pool type, e.g., MME or SGW pool. The Node field is of String type and provides the node object ID associated with the pool, as well as serves as a foreign key, referencing the node table, of the pool object class table. Multiple network elements can logically compose a pool. For instance, a MME pool is composed of multiple MMEs and a SGW pool is composed of multiple SGWs. Also, multiple eNodeBs can be logically associated with a pool, e.g., a MME pool or a SGW pool. If a MME pool is composed of 4 MMEs and an eNodeB is associated with one active MME in a MME Pool, then the other three MMEs serve as stand-by MMEs. In the case that the active MME fails, one of the stand-by MMEs will take over the operations of the failed MME. The eNodeB has link connectivity and link checking to all 4 MMEs at the same time.

The cell object represents the logical functions of cell site equipment, such as the functions of an eNodeB. A cell site is further partitioned into multiple sectors. The cell object class has a composition relationship with the sector object class. For instance, a cell object can be composed of a sector object. The cell object class also has an association relationship with the node object class. For instance, a cell object is associated with a particular node object.

TABLE 7

| FIELD NAME | Data Type | FIELD DESCRIPTION/VALUE | Primary Foreign Key | Example |
|---|---|---|---|---|
| PoolID | String | MME Pool Identifier (or Name) | PK | |
| PoolType | String | MME or SGW | | |
| Node | String | node object ID | FK(Node Table) | |

Table 8 illustrates an exemplary cell object class table related to the present disclosure. In Table 8, the EUTRAN-CELL_OBJ_ID is of number type and is the primary key of the table. The eNodeB field is of number type and provides the eNodeB node object referencing the cell object. The eNodeB field serves as a foreign key to the table. The CellSite field is of number type and provides the cell site ID of the location object referencing the cell object. The CellSite field serves as a foreign key to the table.

The sector object represents a subset of cell site logical functions. A sector is allocated with transceiver equipment of an eNodeB device. The sector object class has an association relationship with the port object class. For instance, a sector object is associated with a particular port object.

TABLE 8

| FIELD NAME | Data Type | FIELD DESCRIPTION/VALUE | Primary Foreign Key | Example |
| --- | --- | --- | --- | --- |
| EUTRANCELL_OBJ_ID | Number | EutranCell object DB Key | P | |
| EutranCellID | String | NDR Data | | |
| EutranCellName | String | NDR Data | | |
| ENodeB | Number | Parent ENodeB NODE_OBJ_ID | F(Node Table) | |
| CellSite | Number | Cell Site LOCATION_OBJ_ID | F(Location Table) | |

Figure 9:
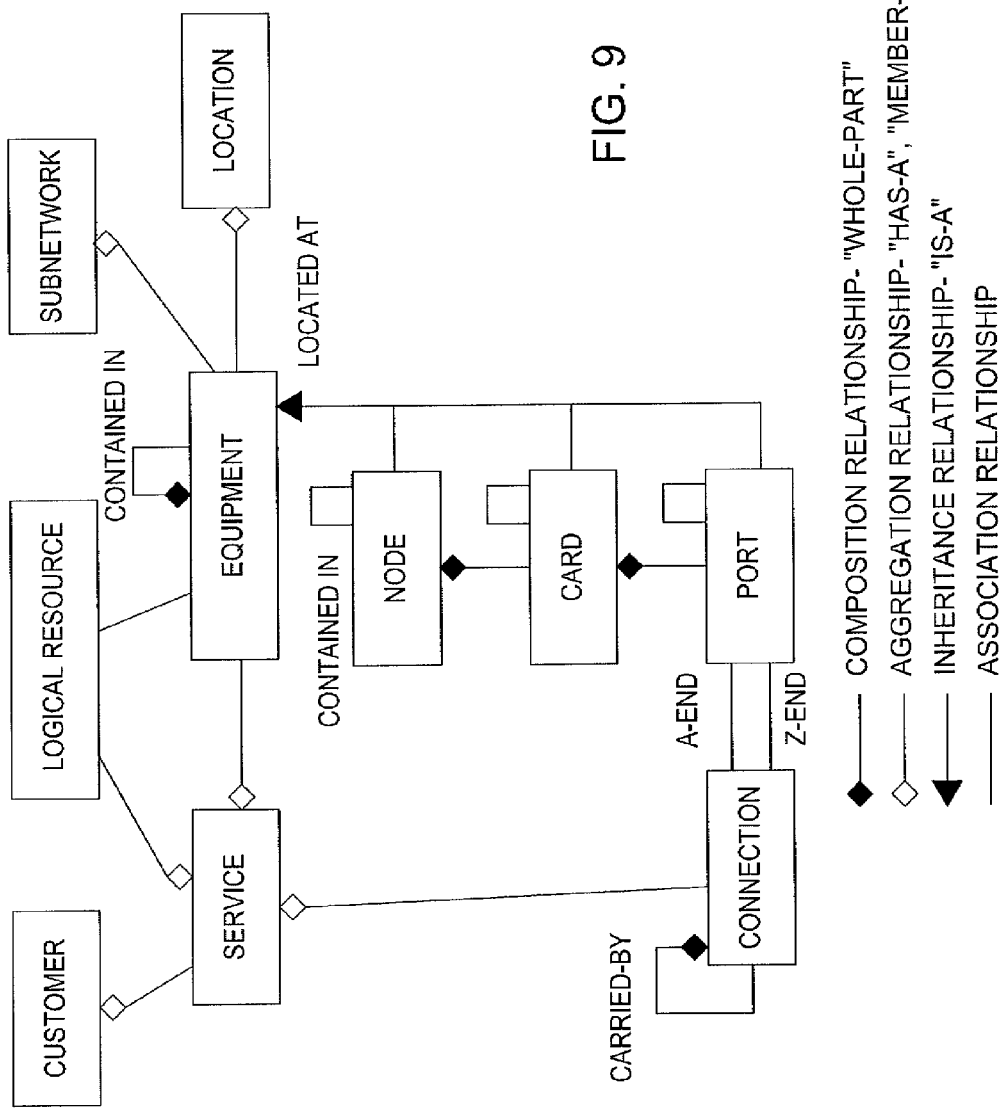
FIG. 9 illustrates another exemplary LTE object model of the present disclosure.

FIG. 9 illustrates another alternative exemplary LTE object model 900 of the present disclosure. The figures shows the relationships between the various objects including the location, equipment, node, card, port, connection, customer, service, logical resource, and subnetwork object classes.

In FIG. 9, equipment object class is an abstract class. The node object class has an inheritance relationship with and inherits from the equipment object class. Similarly, the card object class has an inheritance relationship with and inherits from the equipment object class; the port object class has an inheritance relationship with and inherits from the equipment object class. The node, card, and port object classes have been previously described.

The node object class has a composition relationship with the card object class. For instance, a node object can be composed of a card object.

The card object class has a composition relationship with the port object class. For instance, a card object can be composed of a port object.

The connection object class has an association relationship with the port object class. For instance, a connection object has two termination points, the A and Z ends, and each of the termination points is associated with a port object.

The location object class has an aggregation relationship with the equipment object class. For instance, multiple equipment objects can be aggregated within a location object. The details of the location object class has been previously described.

Similarly, the subnetwork class object and the service object class both have an aggregation relationship with the equipment object class.

The customer object class has an aggregation relationship with the service object class. For instance, multiple customer objects can be aggregated within a service object.

The service object class has an aggregation relationship with the logical resource object class. For instance, multiple service objects can be aggregated within a logical resource object. Logical resource includes, but is not limited to, logical devices, protocol, device interface, software, and process etc.

Figure 5:
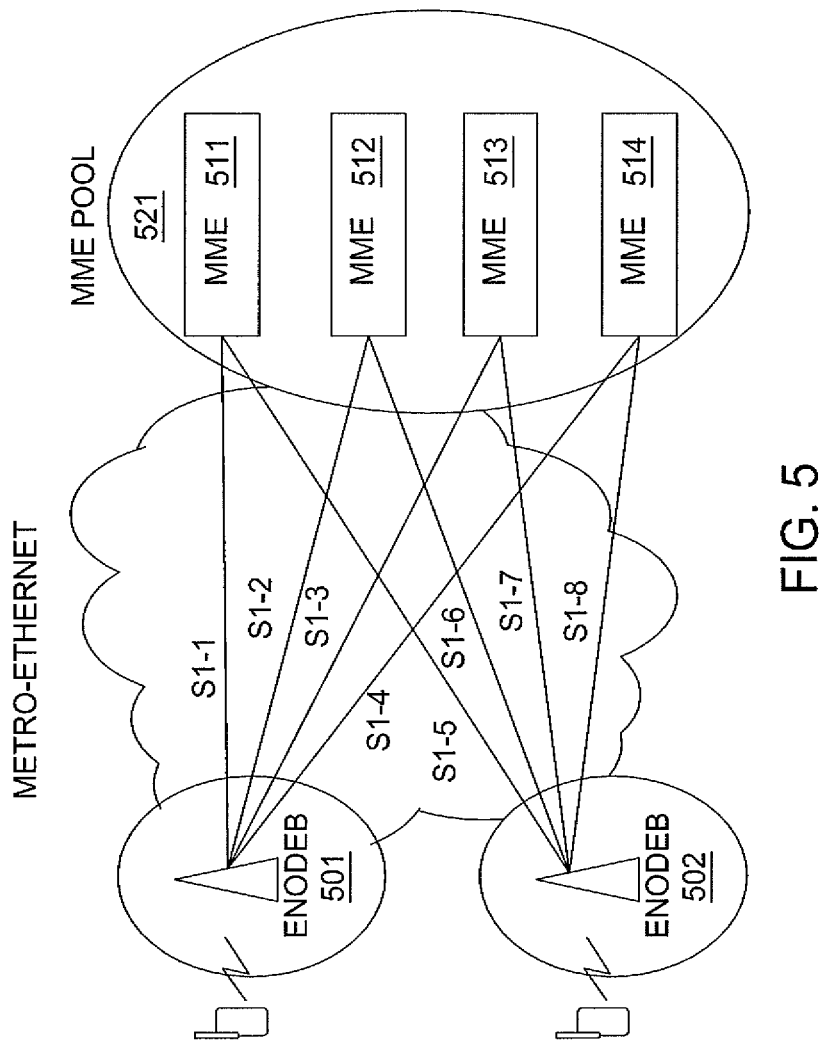
FIG. 5 illustrates an exemplary pool of MMEs related to the present disclosure.

FIG. 5 illustrates an exemplary pool 500 of MMEs related to the present disclosure. In FIG. 5, eNodeB 501 connects to MME Pool 521 via a set of four (4) different connections and eNodeB 512 connects to MME Pool 521 via another set of four (4) different connections. MME pool 521 comprises MME 511, MME 512, MME 513, and MME 514. The eNodeB 501 connects to MME 511 using connection S1-1 (which is the current active connection), to MME 512 using connection S1-2, to MME 513 using connection S1-3, and to MME 514 using connection S1-4. The eNodeB 502 connects to MME 511 using connection S1-5, to MME 512 using connection S1-6, to MME 513 using connection S1-7 (which is the current active connection), and to MME 514 using connection S1-8. Connections S1-1 through S1-8 are logical connections based on the S1 interface specified by the 3GPP standard. Note that eNodeB 501 and eNodeB 502 connect to MME pool 521 via multiple connections for load balancing and failover protection purposes.

Returning to FIG. 2, in step 225, the TBTDCE builds or constructs a topology map of LTE equipment associated with physical and logical network connections, a topology map of layer 2 and layer 3 transport network, and a topology map based on service, location, and sub-network. The maps are constructed using network topology and configuration data retrieved from the NTCID.

Figure 4:
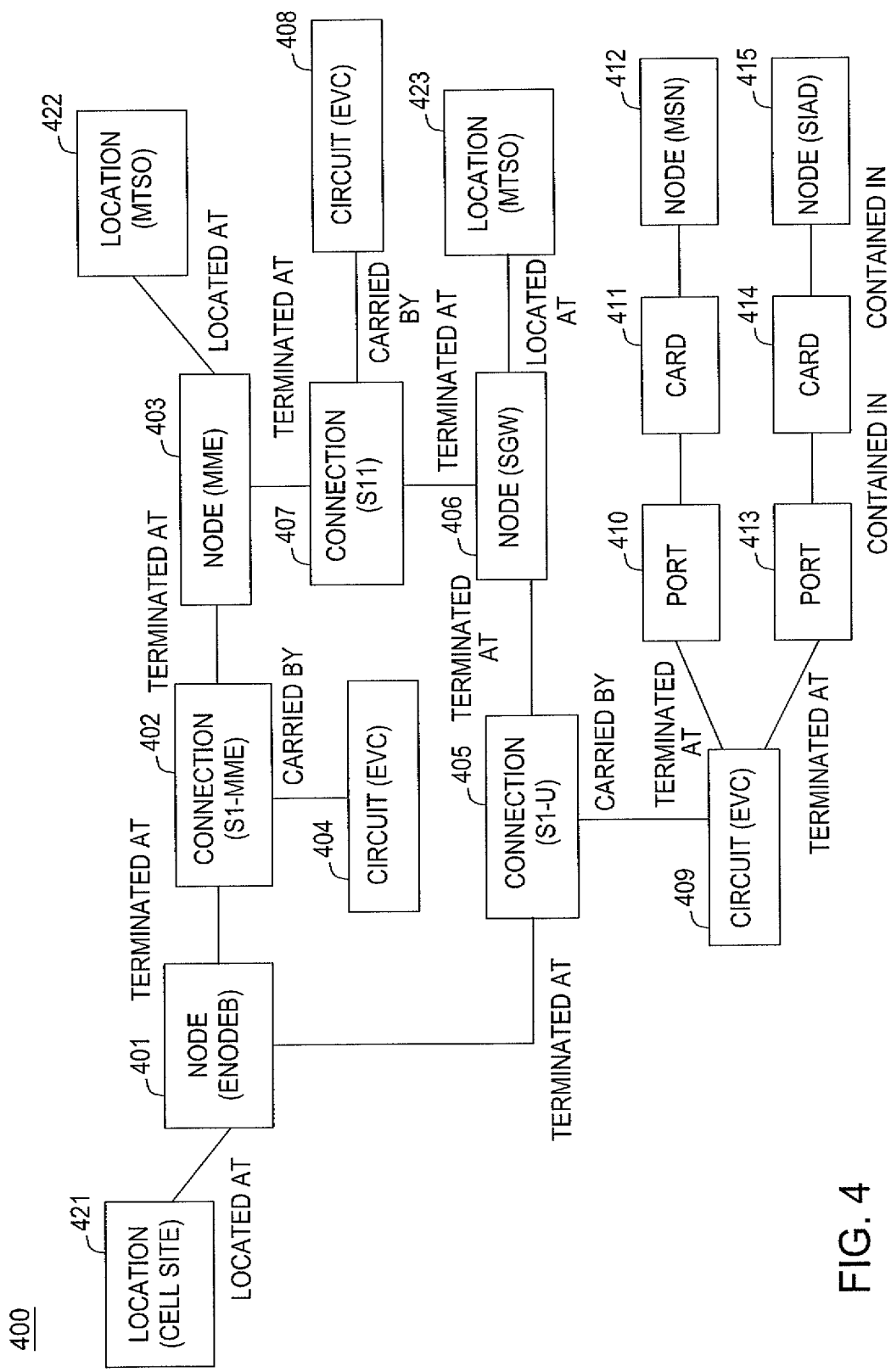
FIG. 4 illustrates an exemplary object diagram showing the relationship between the node, card, and port object classes, between node and location object classes, and of the circuit topology related to the present invention.
Figure 6:
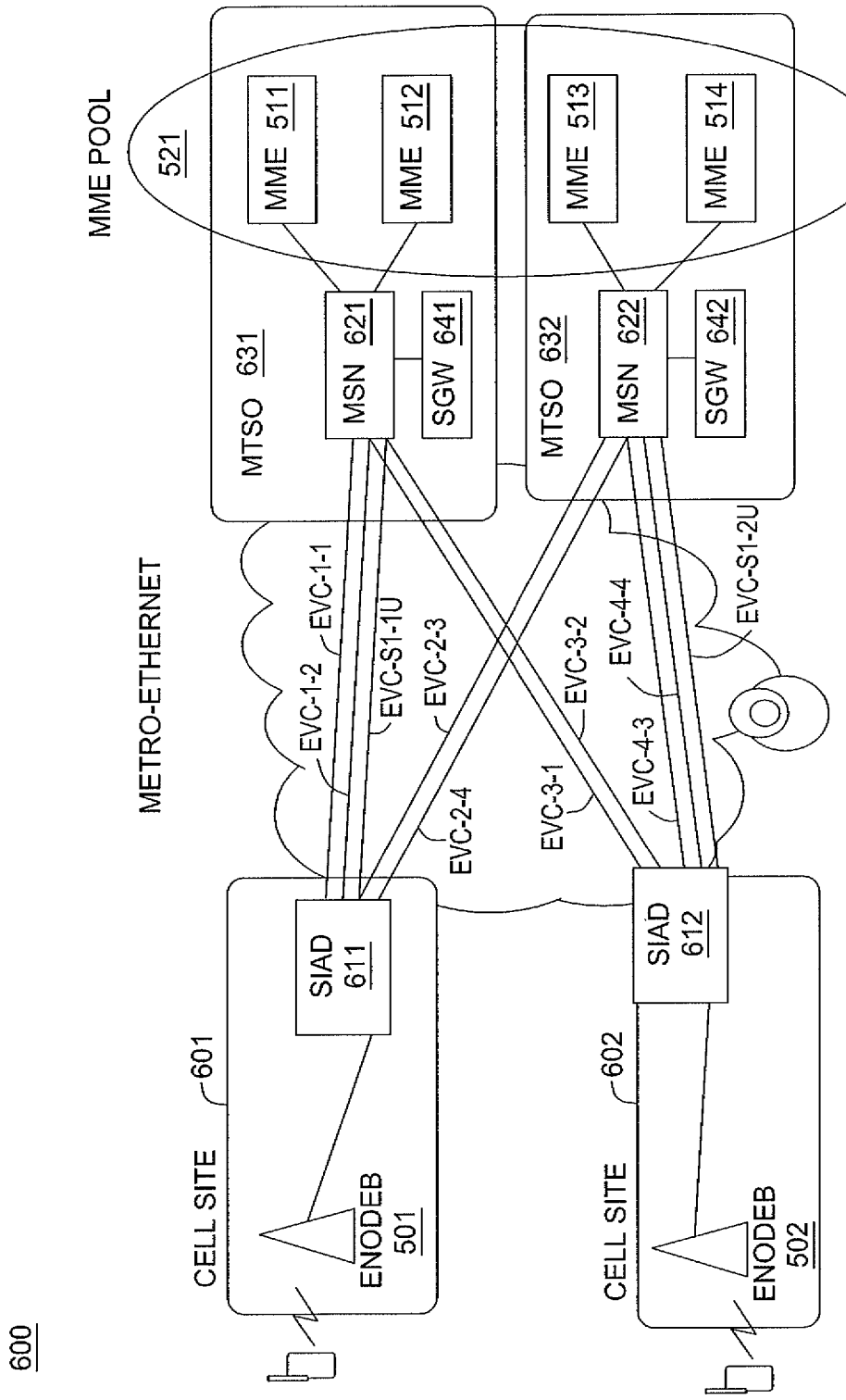
FIG. 6 illustrates an exemplary eNodeB and MME pool relationship of the present disclosure.

FIG. 4 illustrates an exemplary object diagram 400 showing the relationship between the node, card, and port object classes, between node and location object classes, and of the circuit topology related to the present disclosure. In particular, FIG. 4 provides an object model that can be used to construct the logical connection level topology between an eNodeB and a MME as shown in FIG. 5 as well as the circuit (EVC) level topology between an SIAD and a MSN as shown in FIG. 6 below.

For instance, FIG. 4 illustrates that a node, e.g., eNodeB 401, is located in a location, cell site 421. The eNodeB 401 is connected to another node, MME 403, via a connection, S1-MME 402. MME 403 is located in a location, MTSO 422. The connection S1-MME 402 is carried by a circuit, EVC 404.

The eNodeB 401 is also connected to another node, SGW 406, via connection, S1-U 405. SGW 406 is located in a location, MTSO 423. The connection S1-U 405 is carried by a circuit, EVC 409.

EVC 409 is terminated at one end at port 410 on card 411 in a node, MSN 412. EVC 409 is also terminated at another end at port 413 on card 414 in a node, SIAD 415.

In addition, MME 403 is connected to another node, SGW 406, via connection, S11 407. The connection S11 407 is carried by a circuit, EVC 408.

Figure 7:
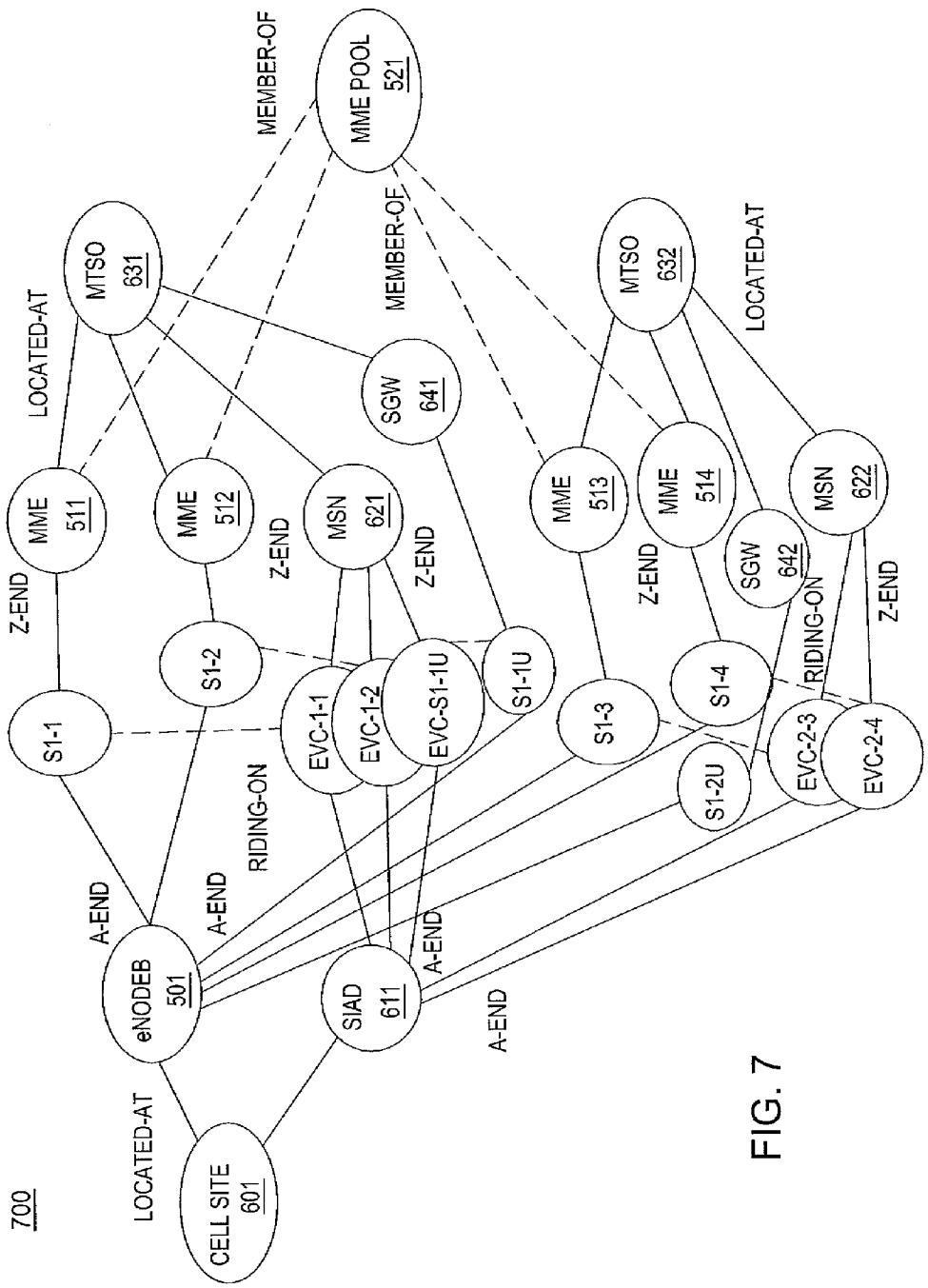
FIG. 7 illustrates an exemplary object diagram showing the connection level and the circuit level topology between an eNodeB and a plurality of MMEs, between an eNodeB and an SGW, between an SIAD and a plurality of MSNs, and between a node and a cell site related to the present disclosure.

FIG. 7 illustrates an exemplary object diagram 700 showing the connection level and the circuit level topology between an eNodeB and a plurality of MMEs, between an eNodeB and an SGW, between an SIAD and a MSN, and between a node and a cell site related to the present disclosure. In particular, FIG. 7 is a specific instance of the object diagram 400 detailing the network topology information of FIG. 6. FIG. 6 will be discussed in detail hereafter.

In FIG. 7, eNodeB 501 and SIAD 611 are located in cell site 601. The eNodeB 501 is connected to MME 511, MME 512, MME 513, and MME 514 via connections S1-1, S1-2, S1-3, and S1-4, respectively. The eNodeB 501 is connected to SGW 641 via connection S1-1U and connected to SGW 642 via connection S1-2U.

SIAD 611 is connected to MSN 621 via circuits EVC-1-1, EVC-1-2, and EVC-S1-1U. The SIAD 611 is connected to MSN 622 via circuits EVC-2-3 and EVC-2-4.

Note that connection S1-1 rides on EVC-1-1, connection S1-2 rides on EVC-1-2, connection S1-3 rides on EVC-2-3, connection S1-4 rides on EVC-2-4, and connection S1-1U rides on EVC-S1-1U.

MME 511, MME 512, and SGW 641 are located in MTSO 631 and MME 513, MME 514, and SGW 642 are located in MTSO 632. MME 511 through MME 514 belong to the same MME Pool 521. MSN 621 is located in MTSO 631 and MSN 622 is located in MTSO 632.

Returning to FIG. 2, in step 230, the TBTDCE provides network alarm correlations to identify the root cause of a network trouble. For example, the source network device of a network trouble is identified based on alarm correlations.

FIG. 6 illustrates an exemplary eNodeB and MME pool relationship 600 of the present disclosure. Note that relationship 600 is shown in object diagram representation in FIG. 7.

In FIG. 6, eNodeB 501 and SIAD 611 are located in cell site 601. The eNodeB 502 and SIAD 612 are located in cell site 602. MSN 621, MME 511, MME 512, and SGW 641 are located in MTSO 631. The MSN 622, MME 513, MME 514, and SGW 642 are located in MTSO 632. MME Pool 521 spans two different MTSOs, 631 and 632, for physical diversity purposes.

In one embodiment, cell site 601 and cell site 602 are connected to the MTSO 631 and MTSO 632 via a metro-Ethernet network. In particular, SIAD 611 in cell site 601 is connected to the MSN 621 in the MTSO 631 via Ethernet virtual circuit EVC-1-1, EVC-1-2, and EVC-S1-1U. The SIAD 612 in cell site 602 is connected to the MSN 622 in the MTSO 632 via Ethernet virtual circuit EVC-4-3, EVC-4-4, and EVC-S1-2U.

The SIAD 612 in cell site 602 is connected to MSN 621 in the MTSO 631 via Ethernet virtual circuit EVC-3-1 and EVC-3-2. The SIAD 611 is connected to MSN 622 in the MTSO 632 via Ethernet virtual circuit EVC-2-3, and EVC-2-4.

Note that logical connections S1-1, S1-2, S1-3, S1-4, S1-5, S1-6, S1-7, and S1-8 as illustrated in FIG. 5 are carried over circuits EVC-1-1, EVC-1-2, EVC-2-3, EVC-2-4, EVC-3-1, EVC-3-2, EVC-4-3, and EVC-4-4 in FIG. 6 respectively. Note that one or more connections can be carried within a single circuit.

Circuit EVC-S1-1U carries user traffic between eNodeB 501 and SGW 641. The circuit EVC-S1-2U carries user traffic between eNodeB 502 and SGW 642.

In one embodiment, when a control card failure occurs in, say, eNodeB 501 as illustrated in FIG. 6, eNodeB 501 will trigger and originate a control card failure alarm and an eNodeB unreachable alarm. Upon detecting the failure at eNodeB 501, MME 511, MME 512, MME 513, and MME 514 will also all originate alarms reporting the same failure. In addition, SGW 641 will also originate an alarm reporting the same failure. The multiple alarms indicating the same control card failure will be correlated by the TBTDCE to identify that eNodeB 501 is the source of the problem. The eNodeB alarm will be treated as the parent alarm and the MME as well as the SGW alarms will be treated as child alarms. The parent alarm identified can be forwarded to the NMS for further actions. The method ends in step 235.

It should be noted that although not explicitly specified, one or more steps of the method 200 described herein may include a storing, displaying and/or outputting step as required for a particular application. In other words, any data, records, fields, and/or intermediate results discussed in the method can be stored, displayed, and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

Figure 8:
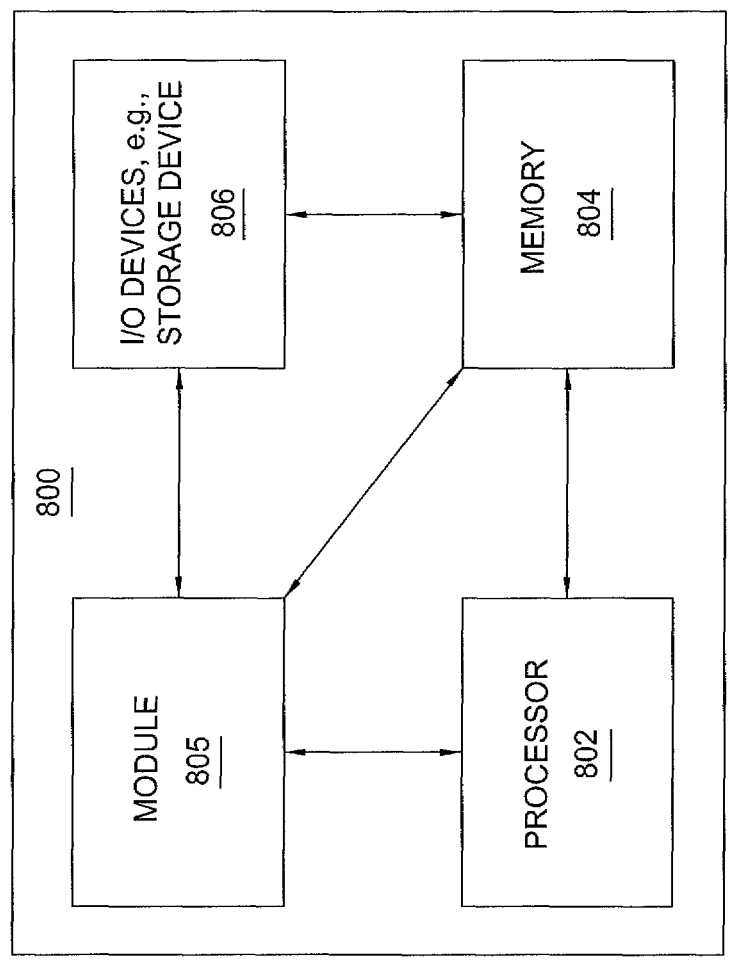
FIG. 8 illustrates a high level block diagram of a general purpose computer suitable for use in performing the functions described herein.

FIG. 8 depicts a high level block diagram of a general purpose computer suitable for use in performing the functions described herein. As depicted in FIG. 8, the system 800 comprises a processor element 802 (e.g., a CPU), a memory 804, e.g., random access memory (RAM) and/or read only memory (ROM), a module 805 for enabling LTE network topology management, and various input/output devices 806 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 805 for enabling LTE network topology management can be loaded into memory 804 and executed by processor 802 to implement the functions as discussed above. As such, the present process 805 for enabling LTE network topology management (including associated data structures) of the present disclosure can be stored on a non-transitory (e.g., tangible and physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a network topology management of a wireless communication network, comprising:

discovering, by a processor, network topology data of the wireless communication network, wherein the wireless communication network comprises a self-healing capability;

identifying, by the processor, a difference between the network topology data that is discovered against a stored network topology data of the wireless communication network, wherein the identifying comprises:

identifying a portion of the network topology data that is different from the stored network topology data stored in a network topology and configuration inventory database; and updating, by the processor, the stored network topology data with the difference that is identified, wherein the updating comprises:

updating the portion of the network topology data that is different from the stored network topology data to an element management system;

updating the portion of the network topology data that is different from the stored network topology data in the network topology and configuration inventory database; and creating objects in a hierarchical manner in accordance with a location, a node, a card, a port, a circuit, a logical connection, a pool, and a cell, and sector objects to reflect the difference in the network topology data, wherein the creating comprises:

creating the objects only if the objects do not exist and that required components associated with a primary key exist.

2. The method of claim 1, wherein the wireless communication network comprises a long term evolution network.

3. The method of claim 2, wherein the discovering comprises:
retrieving the network topology data from a plurality of network devices in the long term evolution network, wherein the plurality of network devices comprises a smart integrated access device, a mobility management entity, and an eNodeB; and
retrieving the network topology data from an element management system.

4. The method of claim 3, wherein the retrieving is performed in accordance with a file transfer protocol.

5. The method of claim 3, wherein the retrieving is performed in accordance with a simple network management protocol.

6. The method of claim 3, wherein the retrieving is performed in accordance with a common object request broker architecture.

7. The method of claim 3, wherein the retrieving is performed in accordance with a web service.

8. The method of claim 3, wherein the retrieving is performed in accordance with an application programming interface.

9. The method of claim 3, wherein the network topology data is retrieved using a ping command to internet protocol addresses of the plurality of network devices and a traceroute command sent to the plurality of network devices to determine a network connectivity of the plurality of network devices.

10. The method of claim 1, wherein the updating the stored network topology data with the difference that is identified further comprises:
modifying existing object table fields containing the stored network topology data with the network topology data that is discovered.

11. The method of claim 1, wherein one of the objects comprises a pool object that comprises:
a Pool_ID field of string type that represents a mobility management entity pool identifier;
a PoolType field of string type that represents a pool type; and
a node field of string type that provides the node object identification associated with the pool object.

12. The method of claim 1, further comprising:
constructing a topology map of the plurality of network devices associated with physical and logical network connections by a topology builder and trouble domain and classification engine, a topology map of layer 2 and layer 3 transport network, and a topology map based on service, location, and sub-network, using network topology data retrieved from a network topology and configuration inventory database; and
providing network alarm correlations to identify a root cause of a network trouble.

13. A non-transitory computer-readable medium storing a plurality of instructions, which when executed by a processor, cause the processor to perform operations for providing a network topology management of a wireless communication network, the operations comprising:
discovering network topology data of the wireless communication network, wherein the wireless communication network comprises a self-healing capability;
identifying a difference between the network topology data that is discovered against a stored network topology data of the wireless communication network, wherein the identifying comprises:
identifying a portion of the network topology data that is different from the stored network topology data stored in a network topology and configuration inventory database; and
updating the stored network topology data with the difference that is identified, wherein the updating comprises:
updating the portion of the network topology data that is different from the stored network topology data to an element management system;
updating the portion of the network topology data that is different from the stored network topology data in the network topology and configuration inventory database; and
creating objects in a hierarchical manner in accordance with a location, a node, a card, a port, a circuit, a logical connection, a pool, and a cell, and sector objects to reflect the difference in the network topology data, wherein the creating comprises:
creating the objects only if the objects do not exist and that required components associated with a primary key exist.

14. The non-transitory computer-readable medium of claim 13, wherein the wireless communication network comprises a long term evolution network.

15. The non-transitory computer-readable medium of claim 14, wherein the discovering comprises:
retrieving the network topology data from a plurality of network devices in the long term evolution network, wherein the plurality of network devices comprises a smart integrated access device, a mobility management entity, and an eNodeB; and
retrieving the network topology data from an element management system.

16. The non-transitory computer-readable medium of claim 13, wherein the identifying comprises:
identifying a portion of the network topology data that is different from the stored network topology data stored in a network topology and configuration inventory database.

17. An apparatus for providing a network topology management of a wireless communication network, comprising:
a processor; and
a computer-readable medium storing a plurality of instructions which, when executed by the processor, cause the processor to perform operations, the operations comprising:
discovering network topology data of the wireless communication network, wherein the wireless communication network comprises a self-healing capability;
identifying a difference between the network topology data that is discovered against a stored network topology data of the wireless communication network, wherein the identifying comprises:
identifying a portion of the network topology data that is different from the stored network topology data stored in a network topology and configuration inventory database; and
updating the stored network topology data with the difference that is identified, wherein the updating comprises:
updating the portion of the network topology data that is different from the stored network topology data to an element management system;

updating the portion of the network topology data that is different from the stored network topology data in the network topology and configuration inventory database; and creating objects in a hierarchical manner in accordance with a location, a node, a card, a port, a circuit, a logical connection, a pool, and a cell, and sector objects to reflect the difference in the network topology data, wherein the creating comprises:

creating the objects only if the objects do not exist and that required components associated with a primary key exist.

* * * * *